(12) United States Patent
Kelley et al.

(10) Patent No.: US 8,597,748 B2
(45) Date of Patent: Dec. 3, 2013

(54) PREFORM FOR MAKING PLASTIC CONTAINER

(75) Inventors: Paul V. Kelley, Wrightsville, PA (US); Gregory A. Trude, Seven Valleys, PA (US)

(73) Assignee: Graham Packaging Company, L.P., York, PA (US)

( * ) Notice: Subject to any disclaimer, the term of this patent is extended or adjusted under 35 U.S.C. 154(b) by 734 days.

(21) Appl. No.: 12/202,676

(22) Filed: Sep. 2, 2008

(65) Prior Publication Data

US 2010/0055369 A1 Mar. 4, 2010

(51) Int. Cl.
*B32B 1/02* (2006.01)
*B32B 5/18* (2006.01)

(52) U.S. Cl.
USPC .................. 428/35.7; 428/34.1; 428/36.9

(58) Field of Classification Search
USPC ................ 428/35.7, 36.92; 264/513
See application file for complete search history.

(56) References Cited

U.S. PATENT DOCUMENTS

| | | |
|---|---|---|
| 4,725,464 A | 2/1988 | Collette |
| 4,927,679 A | 5/1990 | Beck |
| 5,888,598 A | 3/1999 | Brewster et al. |
| 6,051,295 A * | 4/2000 | Schloss et al. ............ 428/35.7 |
| 6,063,325 A | 5/2000 | Nahill et al. |
| 6,248,413 B1 * | 6/2001 | Barel et al. ............... 428/35.7 |
| 6,676,883 B2 | 1/2004 | Hutchinson et al. |
| 7,080,747 B2 | 7/2006 | Lane et al. |

FOREIGN PATENT DOCUMENTS

| | | |
|---|---|---|
| JP | 09 001639 | 1/1997 |
| JP | 2008 189721 | 8/2008 |
| WO | 94/06617 | 3/1994 |

OTHER PUBLICATIONS

International Search Report dated Feb. 23, 2010 for corresponding PCT/US2009/054312.

* cited by examiner

*Primary Examiner* — Ellen S Raudenbush
(74) *Attorney, Agent, or Firm* — Baker Botts L.L.P.

(57) ABSTRACT

A preform for making a lightweighted plastic container includes a finish portion having at least one external thread defined thereon that has a first sidewall thickness, a main body portion, an end cap, and a transition portion between the end cap and the main body portion. The end cap has a second side wall thickness that preferably is not less than said first side wall thickness of the finish portion. The main body portion is preferably unstepped, and the outer surface of the transition portion is preferably concave as viewed in longitudinal cross-section. In addition, the transition portion preferably extends for a longitudinal distance, and a ratio of the longitudinal distance to an outer radius of the end cap is preferably within a range of about 0.3 to about 0.9.

26 Claims, 2 Drawing Sheets

PREFORM FOR MAKING PLASTIC CONTAINER

BACKGROUND OF THE INVENTION

1. Field of the Invention

The present invention relates generally to a preform for use in blow molding a plastic container, and more particularly to a lightweight preform that has particular utility for molding containers that are short or squatty in shape.

2. Description of the Related Technology

Many products that were previously packaged using glass containers are now being supplied in plastic containers, such as containers that are fabricated from polyesters such as polyethylene terephthalate (PET). PET containers are lightweight, inexpensive, and recyclable and can be economically manufactured in large quantities. PET therefore possesses excellent characteristics for containers, but PET resin is relatively expensive. Accordingly, a PET container design that reduces the amount of material that is used without sacrificing performance will provide a significant competitive advantage within the packaging industry.

PET containers are typically manufactured using the stretch blow molding process. This involves the use of a preform that is injection molded into a shape that facilitates distribution of the plastic material within the preform into the desired final shape of the container. The preform is first heated and then is longitudinally stretched and subsequently inflated within a mold cavity so that it assumes the desired final shape of the container. As the preform is inflated, it takes on the shape of the mold cavity. The polymer solidifies upon contacting the cooler surface of the mold, and the finished hollow container is subsequently ejected from the mold.

PET is a crystallizable polymer, meaning that it is available in an amorphous form or a semi-crystalline form. The ability of a PET container to maintain its material integrity is related to the percentage of the PET container in crystalline form, also known as the "crystallinity" of the PET container.

The percentage of crystallinity is characterized as a volume fraction by the equation: % Crystallinity=$(\rho-\rho_a)/(\rho_c-\rho_a) \times 100$ where $\rho$ is the density of the PET material; $\rho_a$ is the density of pure amorphous PET material (1.333 g/cc); and $\rho_c$ is the density of pure crystalline PET material (1.455 g/cc).

The crystallinity of a PET container can be increased by mechanical processing and by thermal processing. Mechanical processing involves orienting the amorphous material to achieve strain hardening. Such mechanical processing commonly involves stretching a PET preform along a longitudinal axis during the stretch blow molding process that is described above and expanding the PET preform along a transverse or radial axis to form a PET container. The combination promotes what is known as biaxial orientation of the molecular structure in the container. Manufacturers of PET containers currently use mechanical processing to produce PET containers having about 15-20% crystallinity in the container's sidewall for most packaging applications.

PET containers are common for use in packaging beverages such as juices using what is known in the industry as the hot-fill process. This involves filling the containers while the liquid product is at an elevated temperature, typically 68° C.-96° C. (155° F.-205° F.) and usually about 85° C. (185° F.) in order to sterilize the container at the time of filling. Containers that are designed to withstand the process are known as "hot fill" type containers. After filling, such containers undergo significant volumetric shrinkage as a result of the cooling of the product within the sealed container. Hot fill type containers accordingly must be designed to have the capability of accommodating such shrinkage. Typically this has been done by incorporating one or more concave vacuum panels into the side wall of the container that are designed to flex inwardly as the volume of the product within the container decreases as a result of cooling. These types of containers must be designed to be strong enough in the areas outside of the vacuum panel regions so that the deformation that occurs as a result of the volumetric shrinkage of a product within the container is substantially limited to the portions of the container that are designed specifically to accommodate such shrinkage.

Preform thickness is determined by the material properties of the plastic from which the preform is made and the intended use of the preform. Specifically, if a preform is to be molded into a container suitable to hot-fill or pasteurization processes, the preform must be thick enough so that the resulting container can withstand processing conditions. Additionally, the preform must have a diameter that is compatible with the machine that is used when the preform is molded to a container. The size and dimensions of a preform are typically engineered so as to facilitate an even distribution of the plastic material that is contained in the sidewall of the preform into the desired final shape of the container so that the final sidewall of the container has a thickness that is relatively constant. This optimizes material usage in a way that minimizes the amount of PET material that is used to fabricate a given container. Unfortunately, it is difficult to achieve efficient material distribution when fabricating certain shapes of containers, particularly containers that have a short or squatty shape. The manufacture of such containers requires a relatively thick preform because of the weight/height ratio of the package. In particular, an excessive amount of material tends to be distributed into the chime and base portions of such containers.

A need accordingly exists for an improved preform and method of making certain shapes of containers that better optimizes material distribution and promotes lightweighting of the container during the manufacturing process.

DETAILED DESCRIPTION OF THE PREFERRED EMBODIMENT(S)

It is accordingly an object of the invention to provide an improved preform and method of making certain shapes of containers that better optimizes material distribution and promotes lightweighting of the container during the manufacturing process.

In order to achieve the above and other objects of the invention, a preform for making a plastic container according to a first aspect of the invention includes a sidewall having an inner surface and an outer surface, the sidewall defining a finish portion having at least one external thread defined thereon, the finish portion having a first sidewall thickness; a main body portion; an end cap, the end cap having a second side wall thickness, the second side wall thickness being not less than the first side wall thickness; and a transition portion between the end cap and the main body portion.

According to a second aspect of the invention, a preform for making a plastic container includes a sidewall having an inner surface and an outer surface, the sidewall defining a finish portion having at least one external thread defined thereon; an unstepped main body portion; an end cap; and a transition portion between the end cap and the main body portion, and wherein a portion of the outer surface of the sidewall that defines the transition portion is concave as viewed in longitudinal cross-section.

A preform for making a plastic container according to a third aspect of the invention includes a sidewall having an inner surface and an outer surface, the sidewall defining a finish portion having at least one external thread defined thereon; a main body portion; an end cap, the end cap having an outer radius; and a transition portion between the end cap and the main body portion, and wherein the transition portion extends for a longitudinal distance, and wherein a ratio of the longitudinal distance to the outer radius of the end cap is within a range of about 0.3 to about 0.9.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
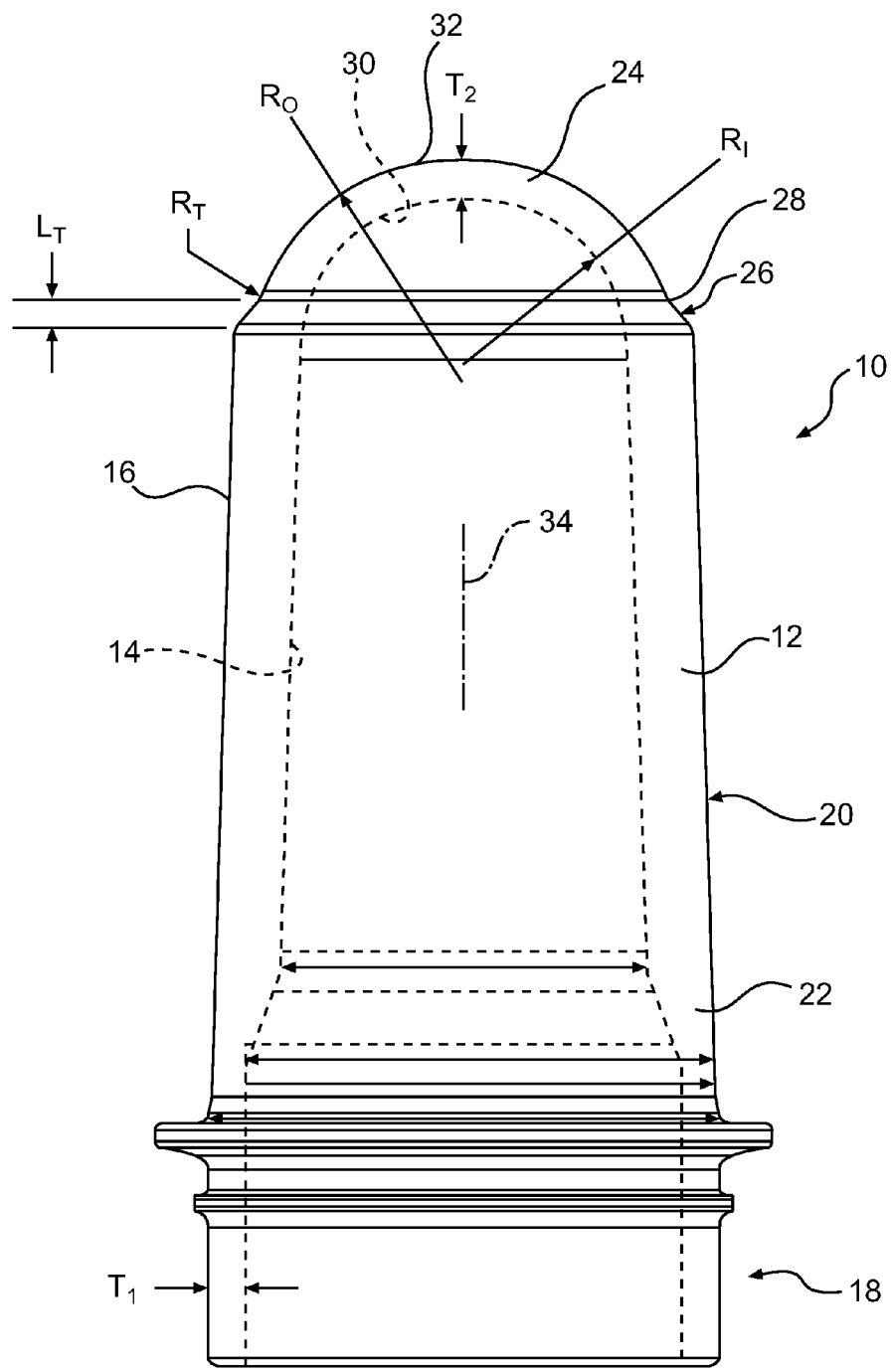
FIG. 1 is a diagrammatical view depicting a preform that is constructed according to a preferred embodiment of the invention.

Referring now to the drawings, wherein like reference numerals designate corresponding structure throughout the views, and referring in particular to FIG. 1, a preform 10 for making a plastic container that is constructed according to a preferred embodiment of the invention is preferably fabricated using an injection molding process is a single, unitary article from a polyester material such as polyethylene terephthalate, which is otherwise known as PET.

Preferably, the PET material from which the preform 10 is fabricated has a crystallinity that is within a range of about 25% to about 35% as formed. Preform 10 is particularly suited for use in the fabrication of containers that have a shape that is relatively short or squatty, and in particular containers that have a height to width ratio of between about 0.3 to about 0.5. Most preferably, a container according to the preferred embodiment of the invention will have a height to width ratio of about 0.35.

As is shown in FIG. 1, preform 10 is generally elongated and roughly cylindrical, having a sidewall 12 that includes an inner surface 14 that defines an interior space and an outer surface 16. A finish portion 18 is located at an open end of the preform 10 and may include exterior threading or other structure to facilitate attachment to a stretch blow molding apparatus and to a closure for the container after it has been formed. A portion of the sidewall 12 that defines the finish portion 18 has a first thickness $T_1$ that is defined as the thickness of the finish portion not including the thickness of any flange or threading that may be provided on the finish portion.

Preform 10 further includes a main body portion 20 that contains material that is intended to be distributed primarily into a main body portion of the desired container, and a neck portion 22 positioned between the finish portion 18 and the main body portion 20. The portion 22 contains material that is intended to be distributed primarily into a neck portion of the desired container. Preform 10 further includes an end cap 24 that is located at a distal, closed end of the preform 10 opposite from the open end of the preform 10 that which the finish portion 18 is located. A transition portion 26 is located between the end cap 24 and the main body portion 20. Plastic material that is contained within the transition portion 26 and the end cap 24 is intended to be distributed primarily into the lowermost portions of the desired container, namely the chime and the base of the container.

The main body portion 20, the transition portion 26 and the end cap 24 are in the preferred embodiment symmetrical about a longitudinal axis 34 of the preform 10. Accordingly, the outer surfaces 16 of the sidewall 12 in the main body portion 20, the transition portion 26 and the end cap 24 are each preferably annular in shape, as will be described in greater detail below.

According to one advantageous aspect of the invention, the end cap 24 has a second sidewall thickness $T_2$ in at least one portion thereof that is not less than the first sidewall thickness $T_1$ of the finish portion 18. In one embodiment of the invention, the second side wall thickness $T_2$ is greater than the first sidewall thickness $T_1$. In a second embodiment of the invention, the second sidewall thickness $T_2$ is substantially equal to the first side wall thickness $T_1$.

In the preferred embodiment of the invention, the end cap 24 is constructed so as to have an inner surface 30 that has a substantially constant radius $R_I$ when viewed in longitudinal cross-section as is shown in FIG. 1. End cap 24 further preferably has an outer surface 32 that has a substantially constant outer radius $R_O$ when viewed in longitudinal cross-section. In other words, both the inner and outer surfaces 30, 32 of the end cap 24 are preferably shaped as a portion of a sphere, and the end cap 24 preferably has a substantially constant thickness $T_2$ throughout.

End cap 24 is preferably shaped so that a ratio of the substantially constant thickness $T_2$ to the outer radius $R_O$ of the outer surface 32 of the end cap 24 is preferably within a range of about 0.20 to about 0.30. More preferably, this range is about 0.21 to about 0.25.

The main body portion 20 of the preform 10 is preferably unstepped, meaning that both the inner and outer surfaces 14, 16 thereof are devoid of any abrupt changes in shape or radius.

The transition portion 26 is located between the end cap 24 and the main body portion 20, as is shown in FIG. 1. The portion of the inner surface 14 of the sidewall that defines the inner surface of the transition portion 26 is preferably shaped as a continuation of the inner surface 30 of the end cap 24 having substantially the same spherical shape and radius $R_I$. The portion of the outer surface 16 of the sidewall 12 that defines the outer surface of the transition portion 26 is preferably concave, having a radius of curvature $R_T$ that is preferably substantially constant for a longitudinal distance along the outer surface thereof. The thickness of the sidewall that defines the transition portion 26 increases from the distal end of the transition portion 26 that joins the end cap 24 to the proximal end of the transition portion 26 that joins the main body portion 20.

The transition portion 26 extends for a longitudinal distance $L_T$ in the direction of the longitudinal axis 34, as is shown in FIG. 1. The ratio of the longitudinal distance $L_T$ to the outer radius $R_O$ of the outer surface 32 of the end cap 24 is preferably within a range of about 0.3 to about 0.9, and more preferably within a range of about 0.40 to about 0.65.

It has been found that an end cap 24 and transition portion 26 as described above substantially improves the efficiency of material distribution in the fabrication of certain types of containers using the stretch blow molding process. More particularly, material distribution in containers that have a relatively short, squatty shape is substantially improved.

Figure 2:
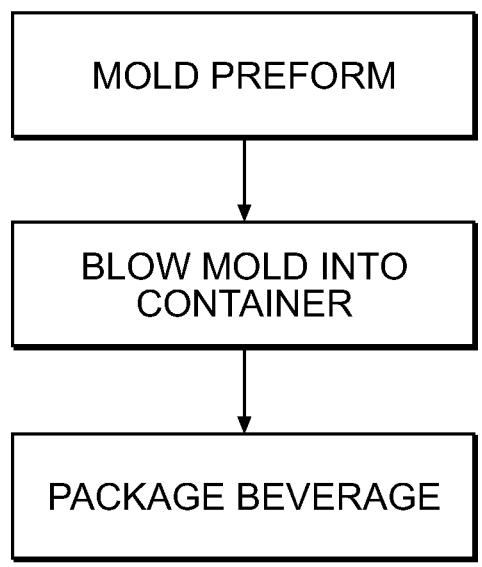
FIG. 2 is a flowchart depicting a method that is performed according to the preferred embodiment of the invention.

According to another aspect of the invention that is diagrammatically depicted in FIG. 2, a method of packaging a product includes a first step of manufacturing a preform 10 is described above using an injection molding process that is otherwise conventional. The preform 10 is then placed in a stretch blow molding apparatus and used to manufacture a container that has a relatively short, squatty shape. This manufacturing step is carried out so as to optimize the material distribution within the container that is being formed. Preferably, although not necessarily, the container that is being formed is a hot-fill type container. The container is filled with a beverage or other material at elevated temperatures using a conventional hot fill process as is described above. The packaged material is then commercially distributed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A preform for making a plastic container, comprising:
   a longitudinal axis;
   a sidewall having an inner surface and an outer surface, said sidewall defining:
      a finish portion having at least one external thread defined thereon, said finish portion having a first sidewall thickness;
      a main body portion;
      an end cap, said end cap having a second side wall thickness, said second side wall thickness being not less than said first side wall thickness, an inner surface of the end cap being curved; and
      a transition portion between said end cap and said main body portion, wherein the inner surface of said sidewall that defines said transition portion is continuous with a proximal portion of the inner surface of the end cap and has a radius taken from the longitudinal axis, wherein the radius remains substantially constant along the transition portion; and a thickness of the sidewall that defines the transition portion increases from a distal end of the transition portion that joins the end cap to a proximal end of the transition portion that joins the main body portion.

2. A preform for making a plastic container according to claim 1, wherein said second sidewall thickness is greater than said first sidewall thickness.

3. A preform for making a plastic container according to claim 1, wherein said second side wall thickness is substantially equal to said first side wall thickness.

4. A preform according to claim 1, wherein a portion of said sidewall defining said main body portion has a substantially constant wall thickness.

5. A preform according to claim 1, wherein said main body portion is unstepped.

6. A preform according to claim 5, wherein a portion of said outer surface of said sidewall that defines said transition portion is concave as viewed in longitudinal cross-section.

7. A preform according to claim 1, wherein an outer surface of said end cap is convexly curved at a substantially constant radius.

8. A preform according to claim 1, wherein the inner surface of said end cap is concavely curved at a substantially constant radius.

9. A preform according to claim 1, wherein said end cap has a substantially constant wall thickness.

10. A preform according to claim 9, wherein a ratio of said substantially constant wall thickness of said end cap to an outer radius of said end cap is within a range of about 0.20 to about 0.30.

11. A preform according to claim 10, wherein said ratio of said substantially constant wall thickness of said end cap to an outer radius of said end cap within a range of about 0.21 to about 0.25.

12. A preform according to claim 1, wherein said transition portion extends for a longitudinal distance, and wherein a ratio of said longitudinal distance to an outer radius of said end cap is within a range of about 0.3 to about 0.9.

13. A preform according to claim 12, wherein said ratio is within a range of about 0.40 to about 0.65.

14. A plastic container made using a preform according to claim 1.

15. A preform for making a plastic container, comprising:
   a longitudinal axis;
   a sidewall having an inner surface and an outer surface, said sidewall defining:
      a finish portion having at least one external thread defined thereon;
      an unstepped main body portion;
      an end cap having a curved inner surface; and
      a transition portion between said end cap and said main body portion, and wherein a portion of said outer surface of said sidewall that defines said transition portion is continuous with a proximal portion of the inner surface of the end cap and concave as viewed in longitudinal cross-section; and wherein said inner surface of said sidewall that defines said transition portion has a radius taken from the longitudinal axis, wherein the radius remains substantially constant along the transition portion.

16. A preform according to claim 15, wherein a portion of said sidewall defining said main body portion has a substantially constant wall thickness.

17. A preform according to claim 15, wherein said end cap has a substantially constant wall thickness.

18. A preform according to claim 17, wherein a ratio of said substantially constant wall thickness of said end cap to an outer radius of said end cap is within a range of about 0.20 to about 0.30.

19. A preform according to claim 18, wherein said ratio of said substantially constant wall thickness of said end cap to an outer radius of said end cap within a range of about 0.21 to about 0.25.

20. A preform according to claim 15, wherein said transition portion extends for a longitudinal distance, and wherein a ratio of said longitudinal distance to an outer radius of said end cap is within a range of about 0.3 to about 0.9.

21. A preform according to claim 20, wherein said ratio is within a range of about 0.40 to about 0.65.

22. A plastic container made using a preform according to claim 15.

23. A preform for making a plastic container, comprising:
   a longitudinal axis;
   a sidewall having an inner surface and an outer surface, said sidewall defining:
      a finish portion having at least one external thread defined thereon;
      a main body portion;

an end cap, said end cap having a curved inner surface and an outer radius;

a transition portion between said end cap and said main body portion, and wherein said transition portion extends for a longitudinal distance, and wherein a ratio of said longitudinal distance to said outer radius of said end cap is within a range of about 0.3 to about 0.9; and wherein said inner surface of said sidewall that defines said transition portion is continuous with a proximal portion of the curved inner surface of the end cap and has a radius taken from the longitudinal axis, wherein the radius remains substantially constant along the transition portion; and wherein a thickness of the sidewall that defines the transition portion increases from a distal end of the transition portion that joins the end cap to a proximal end of the transition portion that joins the main body portion.

24. A preform according to claim 23, wherein said ratio is within a range of about 0.40 to about 0.65.

25. A plastic container made using a preform according to claim 23.

26. A preform according to claim 8, wherein the inner surface of the end cap and the inner surface of the transition portion have substantially the same radius.

* * * * *